United States Patent [19]

Crowley

[11] Patent Number: 4,891,564
[45] Date of Patent: Jan. 2, 1990

[54] DYNAMIC FOCUS CIRCUIT

[75] Inventor: Gregory T. B. Crowley, Whitby, Canada

[73] Assignee: U.S. Philips Corporation, New York, N.Y.

[21] Appl. No.: 301,006

[22] Filed: Jan. 23, 1989

[30] Foreign Application Priority Data

Jan. 28, 1988 [CA] Canada .................................. 557,604

[51] Int. Cl.⁴ ........................ H01J 29/58; H01J 29/56; H01J 29/70
[52] U.S. Cl. .................................... 315/382; 315/370; 315/411
[58] Field of Search ...................... 315/382, 382.1, 411, 315/370, 371; 358/218

[56] References Cited

U.S. PATENT DOCUMENTS 4,611,151 9/1986 Hoover et al. ...................... 315/368
4,683,405 7/1987 Truskalo et al. .................... 315/371

Primary Examiner—Thomas H. Tarcza
Assistant Examiner—Gregory C. Issing
Attorney, Agent, or Firm—Edward W. Goodman

[57] ABSTRACT

A dynamic beam current focussing circuit for providing improved focussing across the screen of a cathode ray video display tube utilizes a tuned voltage step-up transformer to achieve sufficient amplitude of horizontal sweep waveform components of the dynamic focussing voltage. The circuit is useful for high definition television and video display units.

2 Claims, 1 Drawing Sheet

DYNAMIC FOCUS CIRCUIT

BACKGROUND OF THE INVENTION

This invention relates to dynamic focus control circuits for cathode ray display tubes, especially focussing at the extremities (corners, etc.) of a cathode ray tube screen. The invention is suitable for use in high definition video display systems.

In cathode ray tube display systems it is known that it is difficult to maintain a sharp focus of the cathode ray tube electron beam(s) over the total screen area, especially at the extremities, for instance corners. It is desirable to provide a focussing voltage which varies (dynamically) appropriately with beam position to maintain a sharp overall focus.

Systems for maintaining focus across the screen of a cathode ray tube display are known and utilize a dynamic focus voltage, the components of which vary in conjunction with horizontal and vertical sweep voltage in a manner similar to that used with dynamic pincushion and convergence correction systems. A difficulty met with in known focussing systems is in achieving the substantial dynamic focus component voltage changes required across the screen, especially as it relates to the horizontal sweep.

OBJECTS OF THE INVENTION

It is accordingly an object of the invention to provide a dynamic focussing voltage, for cathode ray tube displays, in which the horizontal and vertical components are of adequate amplitude and correct phase to provide sharp focus in all areas of the screen.

SUMMARY OF THE INVENTION

In accordance with the present invention the horizontal dynamic focus component, of sinusoidal form, is produced from the horizontal sweep drive pulses by feeding the pulses to an amplifier feeding the primary winding of a resonant step-up transformer, the gain or driving voltage of the amplifier being controlled by a direct current voltage with a vertical component voltage to produce a series of sinusoidal pulses, at the horizontal sweep frequency, varying in amplitude at the vertical sweep frequency rate. This horizontal dynamic voltage component is summed with a dynamic voltage of parabolic waveform at the vertical sweep frequency and superimposed on the static focus voltage to provide the required sharp focus across the screen. The resonant frequency of the step-up transformer is adjustable in order that the correct phase of the horizontal dynamic focus voltage can be obtained in correlation with beam position on the screen.

BRIEF DESCRIPTION OF THE DRAWINGS

The invention will now be described with reference to the figures of the drawing in which.

DETAILED DESCRIPTION OF THE INVENTION

Figure 1:
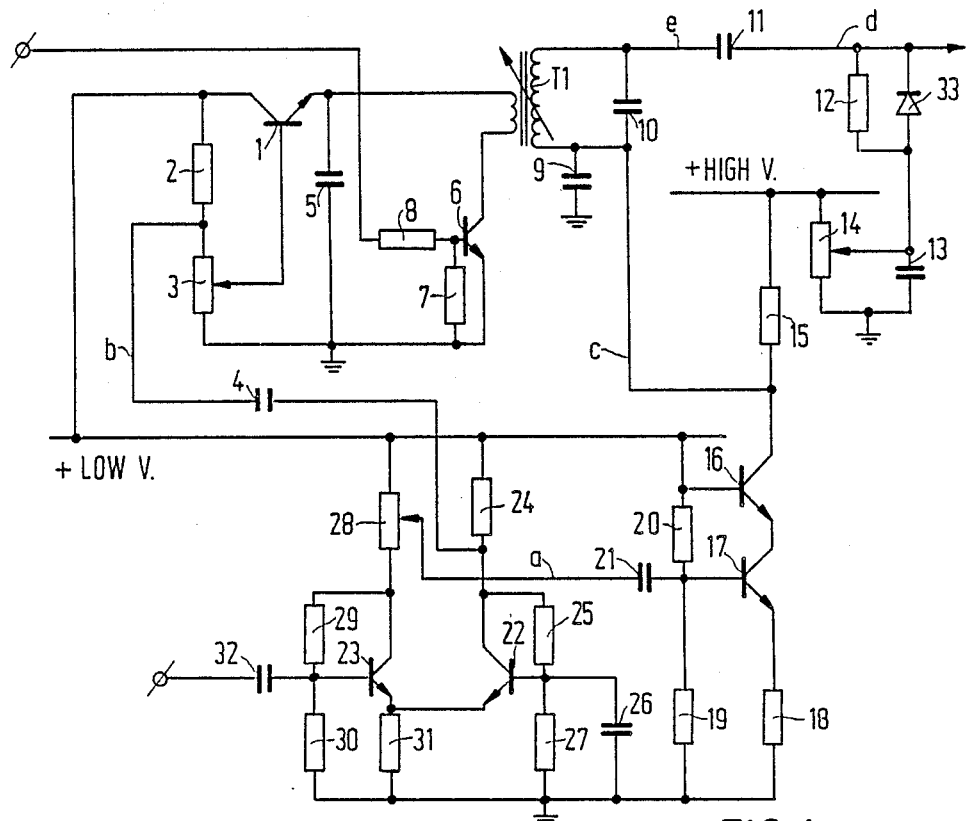
FIG. 1 shows a simplified schematic drawing of a circuit embodiment of the invention, and FIG. 2 a–d inclusive shows voltage waveforms helpful in understanding the operation of the circuit of FIG. 1.

Referring now to FIG. 1, transistor 1 is connected in a series voltage regulation configuration with its collector electrode connected to a source of voltage and the emitter to one end of the primary winding of a resonant or tuned step-up transformer $T_1$. A direct current voltage, varying parabolically at the vertical sweep frequency, is applied to the base electrode of transistor 1 to control the voltage output of the regulator in concurrence therewith so that the regulated voltage varies parabolically at the vertical sweep frequency.

The other end of the primary winding of transformer $T_1$ is connected to the collector electrode of transistor 6 which acts as an amplifier for horizontal drive pulses applied to the base electrode thereof. The secondary winding of the step-up transformer $T_1$ is tuned, in conjunction with a capacitor 10, by a movable core as indicated by the arrow. One end of the secondary winding is effectively at neutral potential, insofar as horizontal frequency alternating current signals are concerned, by virtue of decoupling capacitor 9. The other end of the secondary winding is coupled, by capacitor 11, to the focus voltage line which supplies direct current focus control voltage to the appropriate focus control electrode of the cathode ray tube. The direct current focus voltage is derived from a high voltage source +HV by means of an adjustable potentiometer 14.

A vertical dynamic focussing voltage is provided by an amplifier system including four transistors 16, 17, 22 and 23. A parabolic waveform voltage, at the vertical sweep frequency, is applied via capacitor 32 to the input of a first transistor amplifier incorporating transistors 22 and 23 connected as a differential amplifier, whereby inversely related parabolic waveform voltages are developed across load resistors 28, 24 of transistors 23 and 22 respectively, which are appropriately biased by bleeder networks 29, 30 and 25, 27. Resistor 28, in the form of a potentiometer, provides an adjustable amount of the vertical parabolic waveform voltage to the base of transistor 17. A parabolic waveform voltage, at the vertical frequency, which is developed across resistor 24, is supplied through capacitor 4 to a bleeder network comprising resistor 2 and a potentiometer 3 from which a selected amount of the developed voltage is fed to the base of the voltage regulator transistor 1 to modulate the regulated output at the vertical sweep frequency. The other phase of the parabolic waveform voltage, developed by the transistor 23 circuitry, is taken off the tap of potentiometer 28 and fed to the base of transistor 17 which, in conjunction with transistor 16 and the circuitry associated with these two transistors, provides an amplified vertical frequency parabolic waveform voltage, developed across load resistor 15, to the lower end of the secondary winding of transformer $T_1$ where it is summed with the modulated horizontal sinusoidal waveform voltage developed across the secondary of transformer $T_1$ and supplied through capacitor 11 to the focus control electrode of the cathode ray tube.

Operation of the Dynamic Focus Circuit

The operation of the circuit according to the invention, will be further explained with reference to the voltage waveforms of FIG. 2.

A parabolic waveform voltage, at vertical sweep frequency, is applied as input to the amplifier circuit comprising transistors 22, 23, and versions of this voltage, in inverted relationship with each other, appear across load resistors 28, 24 respectively. The output voltage waveforms developed across the load resistors 28, 24 are shown, respectively in FIGS. 2a and 2b in which the waveform shown in FIG. 2a is inverted with respect to the input voltage and that developed across resistor 24.

Figure 2A:
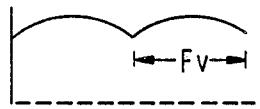
Figure 2B:
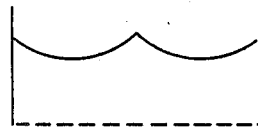

The vertical frequency voltage, FIG. 2b, is applied to the series voltage regulator comprising transistor 1 to control the output voltage in accordance therewith. The output voltage of the regulator acts as the supply for a horizontal drive pulse waveform voltage amplifier, comprising transistor 6, to produce collector modulation, at vertical sweep frequency, of the horizontal pulses in the primary of tuned step-up transformer $T_1$. The resultant stepped-up voltage produced across the secondary winding of transformer $T_1$ is a vertical frequency envelope modulation of the horizontal sweep frequency sinusoidal waveform voltage.

The FIG. 2a phase of the parabolic waveform voltage, at vertical frequency, developed across potentiometer 28, is supplied to the vertical focus output amplifier comprising transistors 16, 17 and appears inverted, at the collector of transistor 16, wherefrom it is supplied, in summing fashion, to the secondary of transformer $T_1$. This summed voltage is shown by the waveform of FIG. 2c and represents the required dynamic focus voltage of a sinusoidal waveform, at the horizontal sweep frequency, amplitude modulated parabolically at the vertical sweep frequency.

Figure 2C:
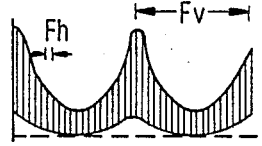
Figure 2D:
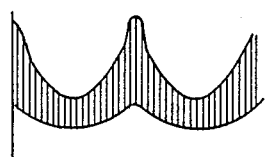

The direct current focussing voltage is derived from the bleeder network comprising potentiometer 14 and on this direct current focus voltage is superimposed on the dynamic focus voltage developed at e of the secondary of transformer $T_1$, see FIG. 2c. A direct current clamping circuit, for maintaining the static focus voltage, is provided by diode 33, resistor 12 and capacitor 13. As will be obvious, the relative amplitudes of the dynamic voltages can be varied by potentiometers 28 and 3 in order to adjust their values for proper focussing across the screen of the cathode ray tube. The use of the resonant or tuned step-up transformer $T_1$ provides adequate horizontal voltage component so that no difficulty is met with in providing focus at the extremities of the screen. Furthermore, the possibility of phase adjustment of the voltages, by tuning the resonant secondary of transformer $T_1$ allows for achieving a constant focus sharpness at all points on the screen.

Although a preferred embodiment of the invention is described it will be obvious, to those skilled in the art, that modifications may be made which do not depart from the spirit and scope of the invention as defined in the appended claims. For instance, although the described embodiment is directed to dynamic voltage type focussing the method and circuitry can be readily adapted for use in systems where current focussing is employed.

I claim:

1. A circuit for producing a dynamic focussing voltage varying at vertical and horizontal sweep frequencies for a cathode ray tube video display, comprising:
   a collector voltage modulator having an input to which is applied a pulse waveform voltage at said horizontal sweep frequency, said modulator including a transistor amplifier in which a collector voltage of the transistor amplifier is modulated at said vertical sweep frequency, and a supply circuit for said transistor amplifier, said supply circuit including a series voltage regulator which is dynamically controlled by a parabolic waveform voltage at said vertical sweep frequency;
   a resonant voltage step-up transformer to which an output current of the modulator is applied, said resonant voltage step-up transformer producing a sinusoidal waveform voltage, a further parabolic waveform voltage at said vertical sweep frequency also being supplied to said resonant voltage step-up transformer in summing relation with a sinusoidal voltage resulting from the output current of the modulator thereby producing a dynamic focus voltage including both sinusoidal horizontal and parabolic vertical frequency waveform components, said components being individually adjustable with respect to each other; and
   a clamping circuit for superimposing and clamping said dynamic focus voltage onto a direct current focussing voltage to provide said dynamic focussing voltage for overall-screen focus.

2. A method for producing a dynamic focussing voltage for the beam current of a cathode ray video display tube comprising the steps:
   amplitude modulating a pulse waveform voltage, of horizontal sweep frequency periodicity, by a parabolic waveform voltage of vertical sweep frequency;
   stepping-up the amplitude of said modulated waveform voltage;
   adding said stepped-up modulated waveform voltage to a parabolic waveform voltage at the vertical sweep frequency thereby forming a dynamic force voltage; and
   clamping said dynamic force voltage to a static focussing voltage thereby forming a dynamic focussing voltage for facilitating improved focussing of the cathode ray tube beam current at all points on the screen of the tube.

* * * * *